United States Patent
Huang et al.

(10) Patent No.: US 10,509,923 B2
(45) Date of Patent: Dec. 17, 2019

(54) TOUCH SCREEN SECURITY PROTECTION STRUCTURE AND DISPLAY DEVICE

(71) Applicant: PAX COMPUTER TECHNOLOGY (SHENZHEN) CO., LTD., Shenzhen, Guangdong (CN)

(72) Inventors: Guoliang Huang, Guangdong (CN); Xiaoju Ren, Guangdong (CN); Hongtao Sun, Guangdong (CN); Xiaojin Sun, Guangdong (CN)

(73) Assignee: PAX COMPUTER TECHNOLOGY (SHENZHEN) CO., LTD., Shenzhen, Guangdong (CN)

( * ) Notice: Subject to any disclaimer, the term of this patent is extended or adjusted under 35 U.S.C. 154(b) by 205 days.

(21) Appl. No.: 15/559,921

(22) PCT Filed: Nov. 24, 2016

(86) PCT No.: PCT/CN2016/107107
§ 371 (c)(1),
(2) Date: Sep. 20, 2017

(87) PCT Pub. No.: WO2018/014479
PCT Pub. Date: Jan. 25, 2018

(65) Prior Publication Data
US 2018/0300511 A1    Oct. 18, 2018

(30) Foreign Application Priority Data

Jul. 21, 2016 (CN) .......................... 2016 1 0578438

(51) Int. Cl.
*G06F 21/00* (2013.01)
*G06F 21/84* (2013.01)
(Continued)

(52) U.S. Cl.
CPC ............ *G06F 21/84* (2013.01); *G06F 3/0416* (2013.01); *G06F 21/60* (2013.01)

(58) Field of Classification Search
CPC ................... G06F 1/1656; G06F 21/84; G06F 2221/2143; G06F 21/60; G06F 21/86; G06F 3/0416
See application file for complete search history.

(56) References Cited

U.S. PATENT DOCUMENTS

2010/0060601 A1* 3/2010 Oohira .............. G02F 1/133308
345/173

FOREIGN PATENT DOCUMENTS

| CN | 101128093 | 2/2008 |
|---|---|---|
| CN | 201233600 | 5/2009 |

(Continued)

OTHER PUBLICATIONS

International Search Report and Written Opinion of PCT/CN2016/107107 dated May 2, 2017, 12 pages.

*Primary Examiner* — Tri M Tran
(74) *Attorney, Agent, or Firm* — Rankin, Hill & Clark LLP

(57) ABSTRACT

A touch screen security protection structure including a touch screen, a display screen, and a circuit board, a first signal ribbon cable, and a second signal ribbon cable. The first signal ribbon cable and the second signal ribbon cable are respectively connected with the circuit board via zebra stripes, the first signal ribbon cable and the second signal ribbon cable are provided with protection winding wires, and the protection winding wires are electrically connected with the zebra stripes via contacts. When an attacker lifts the touch screen and the display screen by cutting, the first signal ribbon cable and the second signal ribbon cable are dislocated from the zebra stripes, the protection winding wires are disconnected from the zebra stripes, anti-tamper- (Continued)

ing detection signals then trigger the security response mechanism to erase the sensitive data information from the electronic components of the circuit board.

10 Claims, 6 Drawing Sheets

(51) Int. Cl.
*G06F 3/041* (2006.01)
*G06F 21/60* (2013.01)

(56) References Cited

FOREIGN PATENT DOCUMENTS

| CN | 201293998 | | 8/2009 |
|----|-----------|---|--------|
| CN | 101909097 | | 12/2010 |
| CN | 102573283 | | 7/2012 |
| CN | 104703386 | | 6/2015 |
| CN | 104703386 A | * | 6/2015 |
| CN | 106056002 | | 10/2016 |
| CN | 205942704 | | 2/2017 |

* cited by examiner

TOUCH SCREEN SECURITY PROTECTION STRUCTURE AND DISPLAY DEVICE

TECHNICAL FIELD

The present application relates to the technical field of touch screen security protection, and more particularly to a touch screen security structure and a display device.

BACKGROUND

An existing electronic device with a touch screen structure generally includes a touch screen and a printed-circuit board (PCB), the touch screen is connected with the PCB via a flexible printed circuit (FPC) line, the PCB is provided with electronic components such as a central processing unit (CPU), a storage device, and so on. Generally, sensitive data information of users is stored in the storage device, however, the existing electronic device is not provided with any related security protection structure, attackers can cut the FPC line and lift the touch screen to attack the inner electronic components, thereby stealing the sensitive data information.

BRIEF DESCRIPTION

It is one objective of the present application to provide a touch screen security protection structure, which aims at, among others, solving the problem in the prior art that the electronic device with the touch screen structure has the security hidden danger that the sensitive data information may be stolen.

In order to solve the above technical problem, the present application provides a touch screen security protection structure comprising a touch screen, a display screen, and a circuit board which are sequentially stacked. The touch screen is connected with a first signal ribbon cable, the display screen is connected with a second signal ribbon cable, the first signal ribbon cable and the second signal ribbon cable are respectively connected with the circuit board via zebra stripes, the first signal ribbon cable and the second signal ribbon cable are provided with protection winding wires that are loaded with anti-tampering detection signals, and the protection winding wires are electrically connected with the zebra stripes via contacts.

The touch screen security protection structure provided by embodiments of the present application has the following advantages:

in the above-described touch screen security protection structure, the first signal ribbon cable and the second signal ribbon cable are respectively connected with the circuit board via the zebra stripes, the first signal ribbon cable and the second signal ribbon cable are provided with protection winding wires, and the protection winding wires are electrically connected with the zebra stripes, therefore, it is difficult for an attacker to make an attack by cutting the first signal ribbon cable and the second signal ribbon cable and thereby lift the touch screen and the display screen, the zebra stripes detect movements of the first signal ribbon cable and the second signal ribbon cable, when the attacker lifts the touch screen and the display screen by cutting, if the first signal ribbon cable and the second signal ribbon cable are dislocated from the zebra stripes, the protection winding wires are disconnected from the zebra stripes, the anti-tampering detection signals then trigger the security response mechanism to erase the sensitive data information from the electronic components of the circuit board. In addition, the protection winding wires are electrically connected with the zebra stripes via the contacts, in this way, when the attacker uses conductive liquid to attack the zebra stripes, the protection winding wires connected with the contacts are firstly short-circuited, the security response mechanism is also triggered by the anti-tampering detection signals to erase the sensitive data information from the electronic components of the circuit board.

It is another objective of the present application to provide a display device comprising the above-described touch screen security protection structure.

The display device provided by embodiments of the present application has the following advantages:

because the display device adopts the above touch screen security protection structure, when the display device is subjected to an attack by the attacker, it is difficult for an attacker to make an attack by cutting the first signal ribbon cable and the second signal ribbon cable and thereby lift the touch screen and the display screen, the zebra stripes detect movements of the first signal ribbon cable and the second signal ribbon cable, when the attacker lifts the touch screen and the display screen by cutting, if the first signal ribbon cable and the second signal ribbon cable are dislocated from the zebra stripes, the protection winding wires are disconnected from the zebra stripes, the anti-tampering detection signals then trigger the security response mechanism to erase the sensitive data information from the electronic components of the circuit board. In addition, the protection winding wires are electrically connected with the zebra stripes via the contacts, in this way, when the attacker uses conductive liquid to attack the zebra stripes, the protection winding wires connected with the contacts are firstly short-circuited, the security response mechanism is also triggered by the anti-tampering detection signals to erase the sensitive data information from the electronic components of the circuit board.

DETAILED DESCRIPTION

Figure 1:
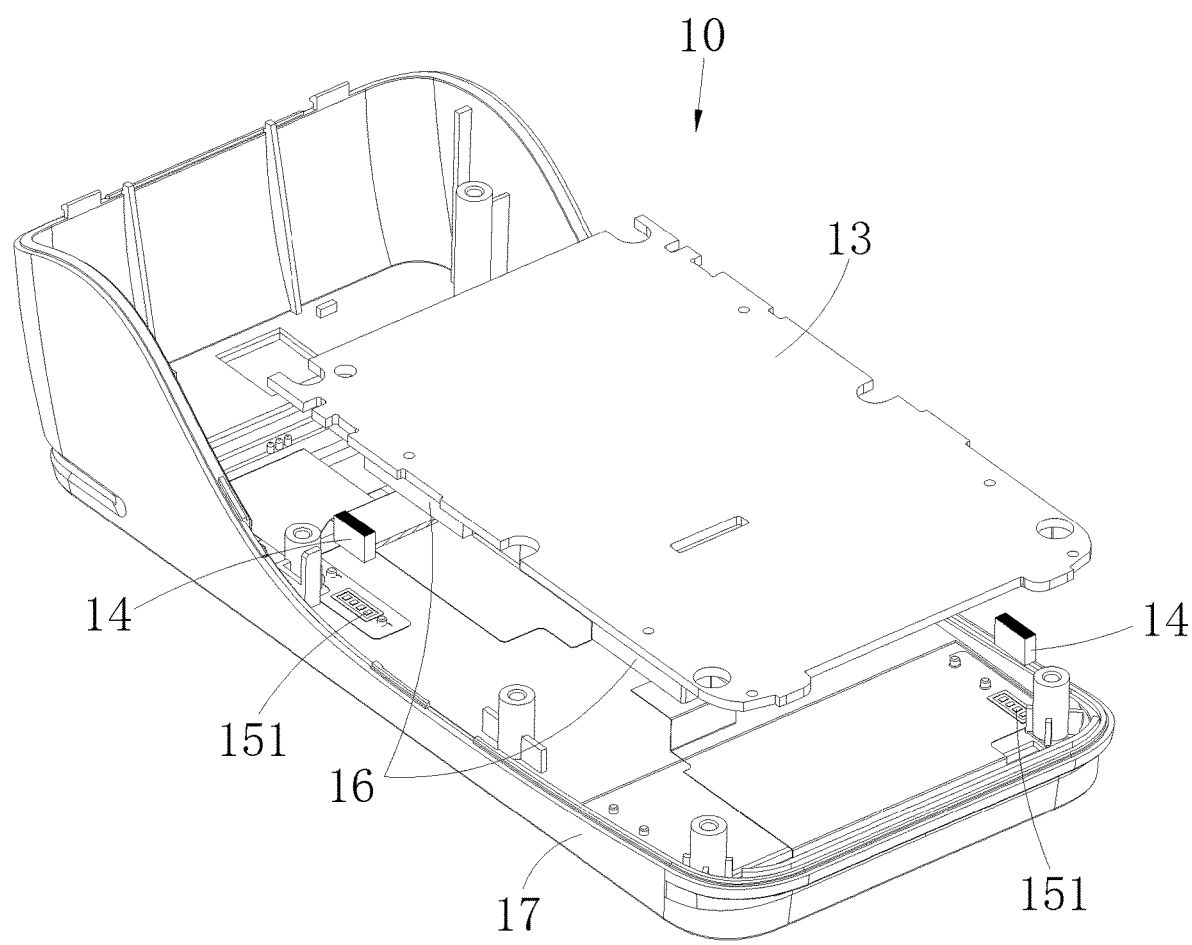
FIG. 1 is a structural schematic view of a touch screen security protection structure provided by an embodiment of the present application.

In order to make the purposes, technical solutions, and advantages of the present application clearer and more understandable, the present application will be further described in detail hereinafter with reference to the accompanying drawings and embodiments. It should be understood that the embodiments described herein are only intended to illustrate but not to limit the present application.

FIGS. 1-6 illustrate preferred embodiments provided by the present application.

It should be noted that when an element is described as "fixed" or "arranged" on/at another element, it means that the element can be directly or indirectly fixed or arranged on/at another element. When an element is described as "connected" to/with another element, it means that the element can be directly or indirectly connected with/with another element.

It also should be noted that the position terms in the embodiments of the present application, such as "left", "right", "on", "above", "beneath", etc., are merely mutually relative concepts or take a normal use state of a product as a reference, but should not be considered as any limitation.

As shown in FIGS. 1-5, a touch screen security protection structure 10 provided by this embodiment of the present application comprises a touch screen 11, a display screen 12, and a circuit board 13 which are sequentially stacked, the touch screen 11 is connected with a first signal ribbon cable 111, the display screen 12 is connected with a second signal ribbon cable 121, the first signal ribbon cable 111 and the second signal ribbon cable 121 are respectively connected with the circuit board 13 via zebra stripes 14, the first signal ribbon cable 111 and the second signal ribbon cable 121 are provided with protection winding wires 15 that are loaded with anti-tampering detection signals, and the protection winding wires 15 are electrically connected with the zebra stripes via contacts 151.

As shown in FIGS. 1-5, in the above-described touch screen security protection structure 10, the first signal ribbon cable 111 and the second signal ribbon cable 121 are respectively connected with the circuit board 13 via the zebra stripes 14, the first signal ribbon cable 111 and the second signal ribbon cable 121 are provided with the protection winding wires 15, and the protection winding wires 15 are electrically connected with the zebra stripes 14, therefore, it is difficult for an attacker to make an attack by cutting the first signal ribbon cable 111 and the second signal ribbon cable 121 and thereby lift the touch screen 11 and the display screen 12. The zebra stripes 14 detect movements of the first signal ribbon cable 111 and the second signal ribbon cable 121, when the attacker lifts the touch screen 11 and the display screen 12 by cutting, if the first signal ribbon cable 111 and the second signal ribbon cable 121 are dislocated from the zebra stripes 14, the protection winding wires 15 are disconnected from the zebra stripes 14, and the anti-tampering detection signals then trigger the security response mechanism to erase sensitive data information from the electronic devices of the circuit board 13. In addition, the protection winding wires 15 are electrically connected with the zebra stripes 14 via the contacts, in this way, when the attacker uses conductive liquid to attack the zebra stripes 14, the protection winding wires 15 connected with the contacts are firstly short-circuited, the security response mechanism is also triggered by the anti-tampering detection signals to erase the sensitive data information from the electronic components of the circuit board 13.

Specifically, the protection winding wires 15 are wound in a circumferential direction of the contacts 151, in this way, when the attacker uses conductive liquid to attack the zebra stripes 14, the protection winding wires 15 wound in the circumferential direction of the contacts 15 are easier to be subjected to the influence of the conductive liquid and thus cause short-circuit, which enables the anti-tampering detection signals to trigger the security response mechanism to erase the sensitive data information from the electronic components of the circuit board 13.

As shown in FIGS. 1-5, in order to prevent the zebra stripes 14 from being short-circuited or detected, the above-described touch screen security protection structure 10 further comprises a protection wall 16 arranged in a circumferential direction of the zebra stripes 14, the protection wall 16 is provided with the protection winding wires 15. In this way, when the attacker tries to use a probe to pierce the zebra stripes 14, it is required to firstly make the protection wall 16 wound with the protection winding wires 15 disabled, otherwise, the protection winding wires 15 on the protection wall 16 would trigger the security response mechanism to erase the sensitive data information from the electronic components of the circuit board 13.

More specifically, in order to increase the difficulty to make the protection wall 16 disabled, the protection winding wires 15 are distributed on a whole inner side of the protection wall 16. In this way, the protection winding wires 15 distributed on the whole inner side of the protection wall 16 is more difficult to be subjected to the attack launched by the attacker.

Figure 2:
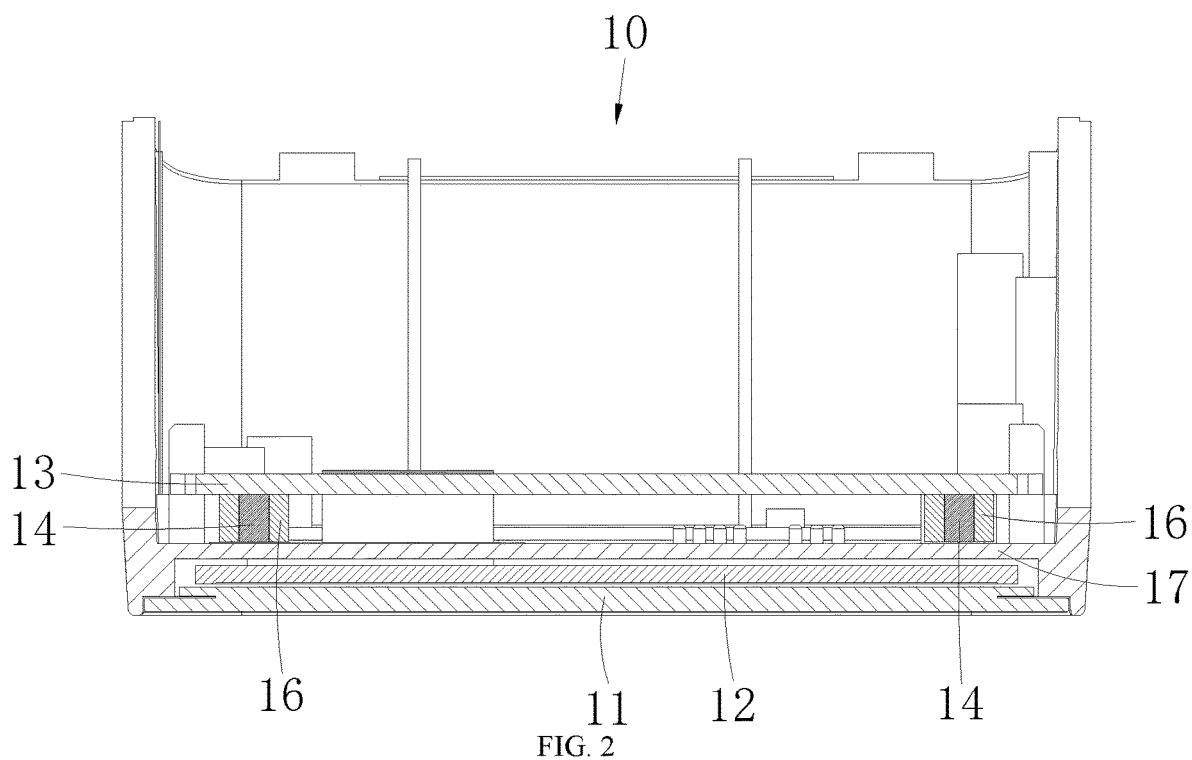
FIG. 2 is a sectional view of a touch screen security protection structure provided by an embodiment of the present application.
Figure 5:
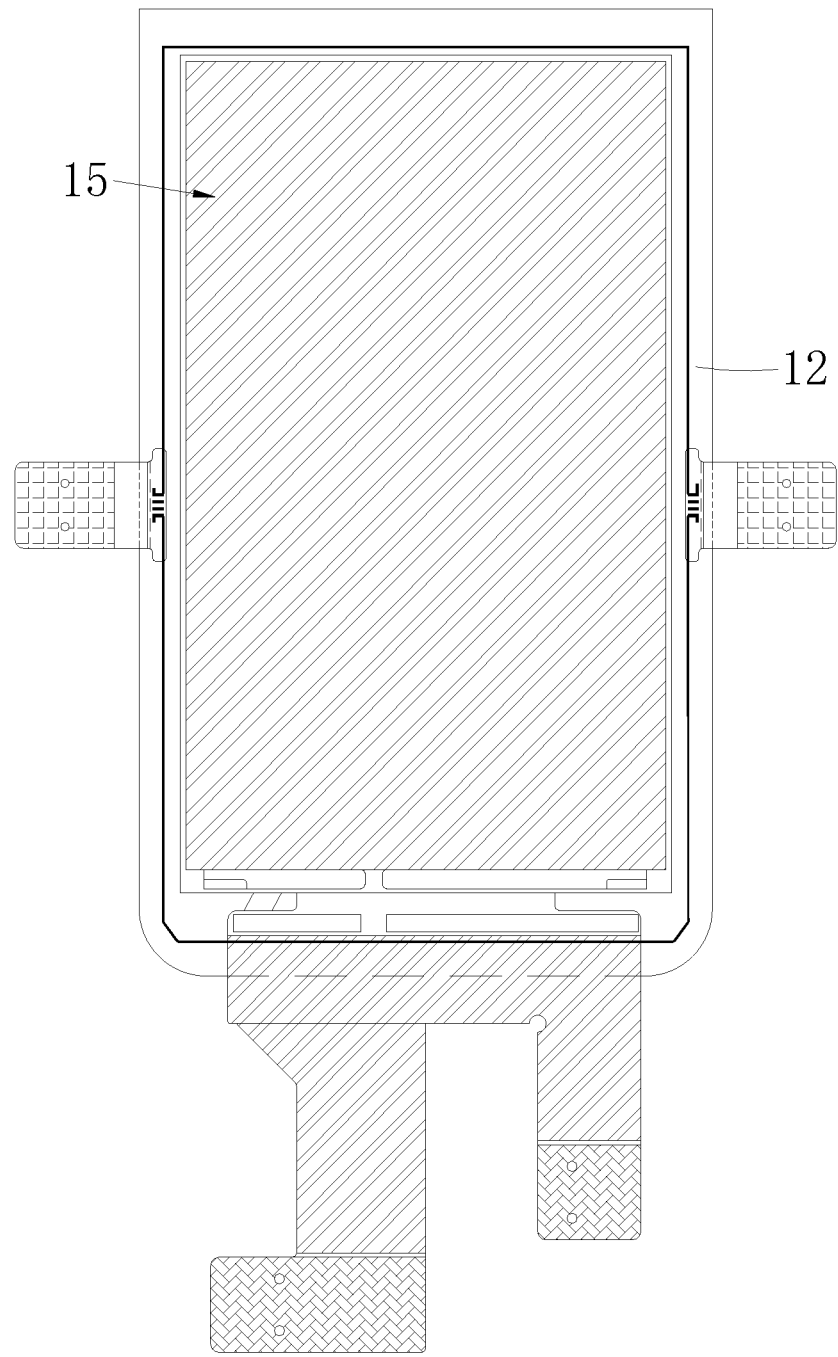
FIG. 5 is another structural schematic view of a protection line of a touch screen security protection structure provided by an embodiment of the present application.
Figure 6:
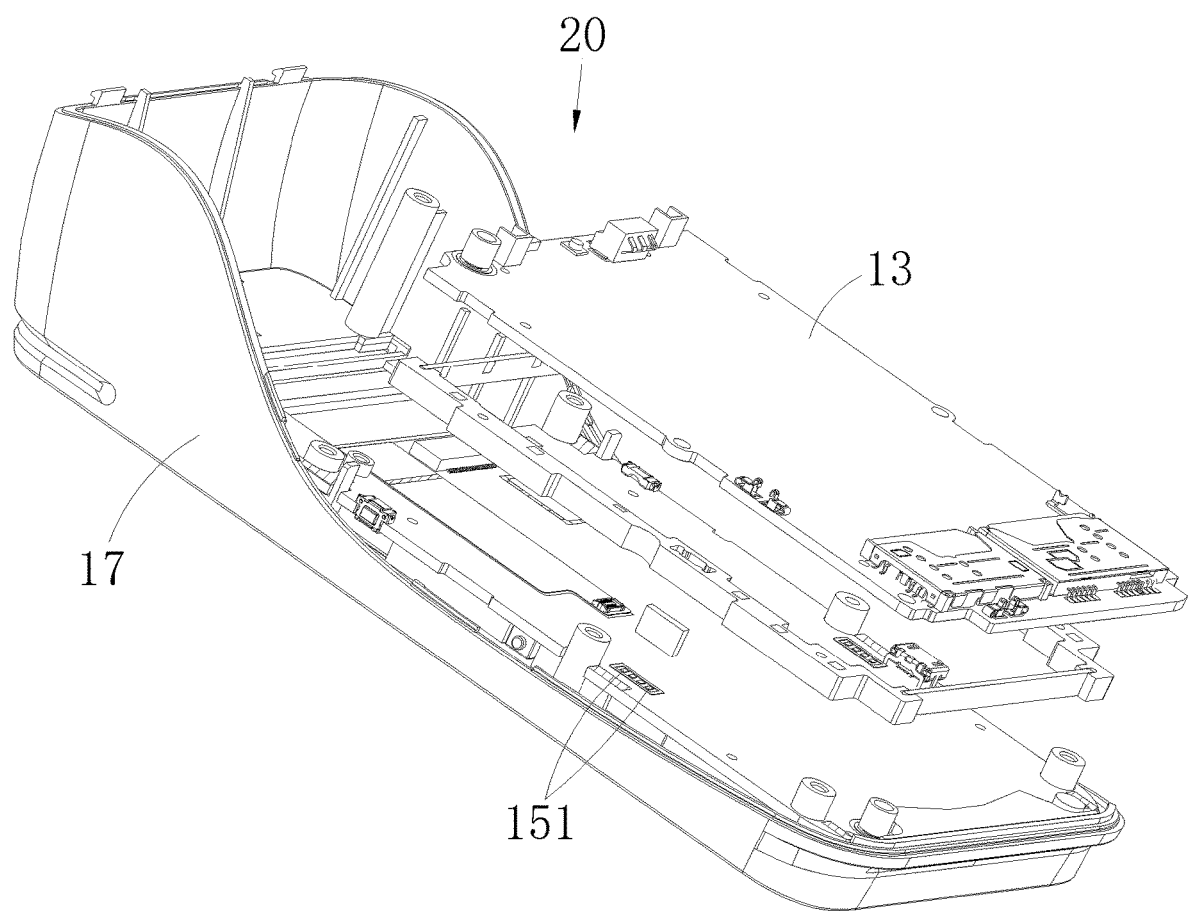
FIG. 6 is a structural schematic view of a display device provided by an embodiment of the present application.

As shown in FIGS. 1-2 and FIG. 5, when the attacker lifts the touch screen 11 and the display screen 12 by cutting, to facilitate the trigger of the security response mechanism by the protection winding wires 15, the protection winding wires 15 are distributed on a surface of the touch screen 11 attached to the display screen 12. In this way, when the touch screen 11 and the display screen 12 are subjected to any attack, it is possible to make the protection winding wires 15 disconnected or short-circuited and to trigger the security response mechanism.

Figure 4:
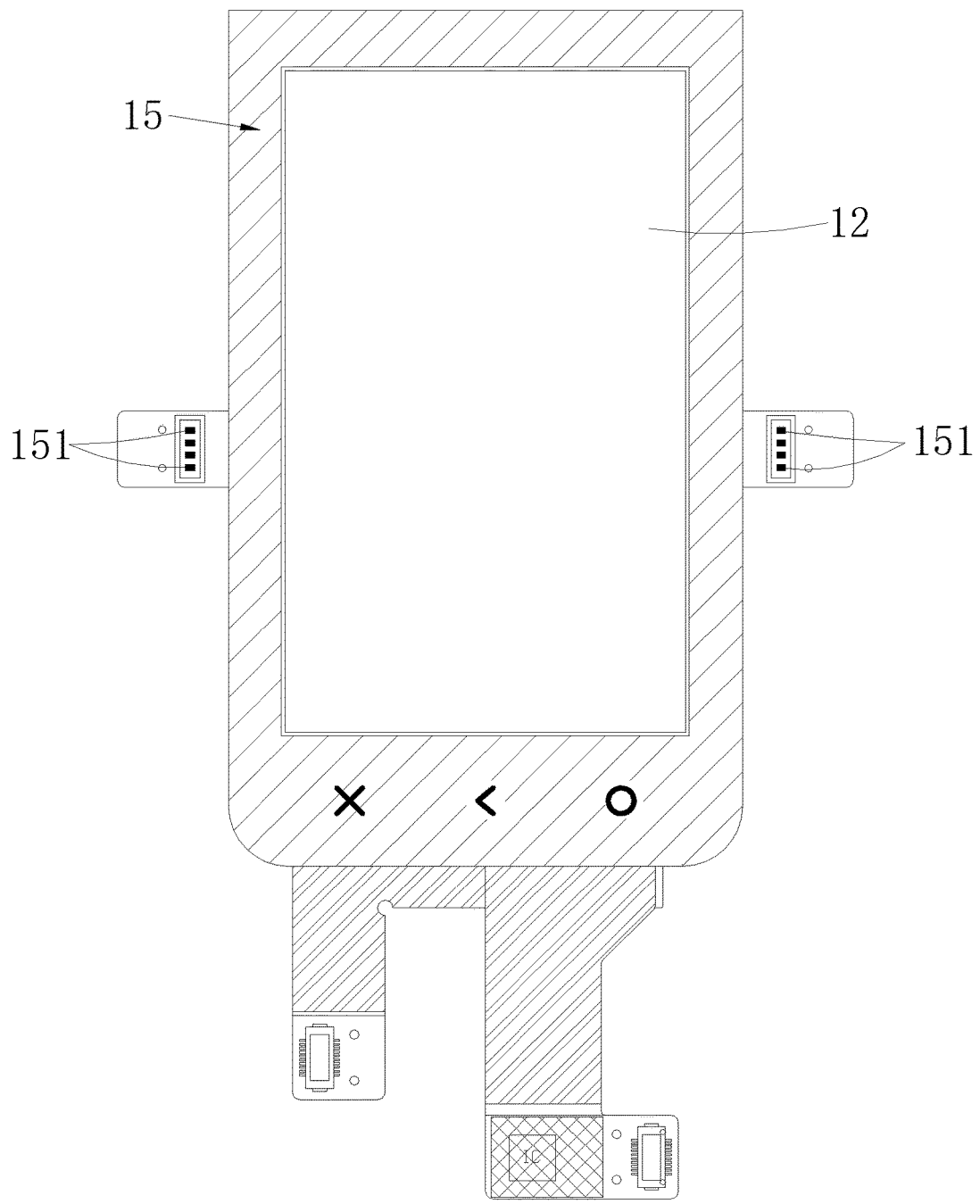
FIG. 4 is a structural schematic view of a protection line of a touch screen security protection structure provided by an embodiment of the present application.

It can also be understood that, as shown in FIGS. 1-2 and FIG. 4, alternatively, the surface of the touch screen 11 attached to the display screen 12 is provided thereon with protection winding wires 15 arranged along a periphery of the contact screen 11. In this way, when the contact screen 11 and the display screen 12 are subjected to cutting and lifting by the attacker, the protection winding wires 15 arranged along the periphery of the contact screen 11 will firstly trigger the security response mechanism.

It should be noted that the protection winding wires 15 can also be arranged on any one side of the touch screen 11, or the protection winding wires 15 are arranged on any two sides of the touch screen 11, or the protection winding wires 15 are arranged on any three sides of the touch screen 11. As long as the protection winding wires 15 are arranged on the touch screen 11, the security response mechanism can be triggered by the protection winding wires 15, thereby ensuring that the electronic device is prevented from stealing of sensitive data information.

Specifically, each of the protection winding wires 15 comprises a first sensing line, a second sensing line, and a third sensing line respectively forming conductive loops with each of the zebra stripes 14. Any two of the three paths of signals are short-circuited will trigger the security response mechanism.

It can also be understood that, each of the protection winding wires 15 can be formed by a single path of sensing line, or each of the protection winding wires 15 can be formed by two paths of the sensing lines.

In order to make the touch screen 11 and the display screen 12 difficult to be cut or lifted, the touch screen 11 and the display screen 12 are adhered together. Specifically, the touch screen 11 and the display screen 12 are tightly adhered together by an optical adhesive (OCA). In this way, the touch screen 11 and the display screen 12 are unable to be separated simply, and special cutting tools are required, which increases the difficulty to be attacked.

Figure 3:
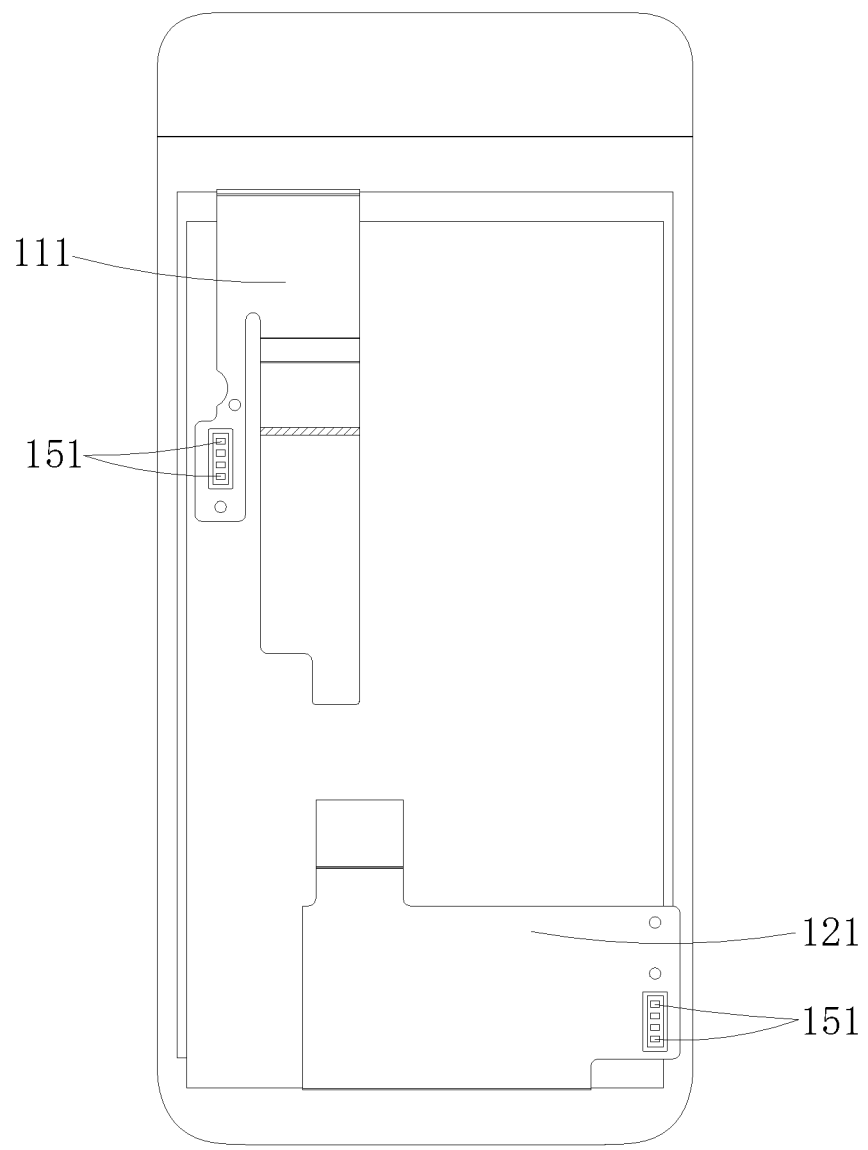
FIG. 3 is a structural schematic view of a first signal ribbon cable and a second signal ribbon cable of a touch screen security protection structure provided by an embodiment of the present application.

Specifically, as shown in FIGS. 1-3, the first signal ribbon cable 111 and the second signal ribbon cable 121 are both extended out of one end of the circuit board 13.

Alternatively, the first signal ribbon cable 111 is extended out of one end of the circuit board 13 and the second signal ribbon cable 121 is extended out of the other end of the circuit board 13. In this way, the two ends of the circuit board 13 are respectively subjected to tension actions exerted by the first signal ribbon cable 111 and the second signal ribbon cable 121, so that the circuit board 13 is better attached to the touch screen 11 and the display screen 12, in which, the two ends of the circuit board 13 can be two opposite ends or two adjacent ends.

The above-described touch screen security protection structure 10 further comprises a housing 17, and the touch screen 11, the display screen 12, and the circuit board 13 are accommodated in the housing 17.

A display device is also provided by this embodiment of the present application, and the display device comprises the above-described touch screen security protection structure 10.

As shown in FIGS. 1-6, because the display device 20 adopts the above-described touch screen 11 security protection structure 10, when the display device 20 is subjected to an attack by an attacker, it is difficult for the attacker to make an attack by cutting the first signal ribbon cable 111 and the second signal ribbon cable 121 and thereby lift the touch screen 11 and the display screen 12, the zebra stripes 14 detect movements of the first signal ribbon cable 111 and the second signal ribbon cable 121, when the attacker lifts the touch screen 11 and the display screen 12 by cutting, if the first signal ribbon cable 111 and the second signal ribbon cable 121 are dislocated from the zebra stripes 14, the protection winding wires 15 are disconnected from the zebra stripes 14, the anti-tampering detection signals then trigger the security response mechanism to erase the sensitive data information from the electronic components of the circuit board 13. In addition, the protection winding wires 15 are electrically connected with the zebra stripes 14 via the contacts, in this way, when the attacker uses conductive liquid to attack the zebra stripes 14, the protection winding wires 15 connected with the contacts are firstly short-circuited, the security response mechanism is also triggered by the anti-tampering detection signals to erase the sensitive data information from the electronic components of the circuit board 13.

The aforementioned embodiments are only preferred embodiments of the present application, which are in no way used for limiting the present application. Any modification, equivalent replacement and improvement which are made within the spirit and the principle of the present application should be included in the scope of the present application.

The invention claimed is:

1. A touch screen security protection structure, comprising:
   a touch screen, a display screen, and a circuit board which are sequentially stacked;
   wherein the touch screen is connected with a first signal ribbon cable, the display screen is connected with a second signal ribbon cable, the first signal ribbon cable and the second signal ribbon cable are respectively connected with the circuit board via zebra stripes, the first signal ribbon cable and the second signal ribbon cable are provided with protection winding wires that are loaded with anti-tampering detection signals, and the protection winding wires are electrically connected with the zebra stripes via contacts, wherein a protection wall is arranged in a circumferential direction of the zebra stripes, and wherein the protection wall is provided with the protection winding wires.

2. The structure of claim 1, wherein the protection winding wires are distributed on a whole inner side of the protection wall.

3. The structure of claim 1, wherein the protection winding wires arranged along a periphery of the display screen are distributed on a surface of the touch screen attached to the display screen.

4. The structure of claim 1, wherein a surface of the touch screen attached to the display screen is provided with protection winding wires that are arranged along a periphery of the contact screen.

5. The structure of claim 1, wherein each of the protection winding wires comprises a first sensing line, a second sensing line, and a third sensing line respectively forming conductive loops with the zebra stripes.

6. The structure of claim 1, wherein both the first signal ribbon cable and the second signal ribbon cable are extended out of one end of the circuit board; or, the first signal ribbon cable is extended out of one end of the circuit board and the second signal ribbon cable is extended out of the other end of the circuit board.

7. The structure of claim 1, further comprising a housing, the touch screen, the display screen, and the circuit board are accommodated in the housing.

8. The structure of claim 1, wherein the touch screen and the display are adhered together.

9. The structure of claim 1, wherein the protection winding wires are wound in a circumferential direction of the contacts.

10. A display device comprising a touch screen security protection structure including:
    a touch screen, a display screen, and
    a circuit board which are sequentially stacked;
    wherein the touch screen is connected with a first signal ribbon cable, the display screen is connected with a second signal ribbon cable, the first signal ribbon cable and the second signal ribbon cable are respectively connected with the circuit board via zebra stripes, the first signal ribbon cable and the second signal ribbon cable are provided with protection winding wires that are loaded with anti-tampering detection signals, and the protection winding wires are electrically connected with the zebra stripes via contacts, wherein a protection wall is arranged in a circumferential direction of the zebra stripes, and wherein the protection wall is provided with the protection winding wires.

* * * * *